United States Patent [19]
Beaston

[11] 3,820,823
[45] June 28, 1974

[54] LOCKING DEVICE FOR TRAILER HITCHES

[76] Inventor: Bud A. Beaston, Rt. 1 Box 13, Sperry, Okla. 74073

[22] Filed: Jan. 11, 1973

[21] Appl. No.: 322,740

[52] U.S. Cl. ................................. 280/512, 70/258
[51] Int. Cl. ............................................. B60d 1/06
[58] Field of Search .......... 280/511, 512, 513, 507; 70/58, 258, 14; 292/289, 288

[56] References Cited
UNITED STATES PATENTS

| | | | |
|---|---|---|---|
| 2,035,486 | 3/1936 | Larson | 280/512 |
| 2,204,882 | 6/1940 | Berluti | 280/511 |
| 3,650,546 | 3/1972 | Koenig | 280/512 |

Primary Examiner—James R. Boler
Assistant Examiner—Wai M. Chan
Attorney, Agent, or Firm—William S. Dorman

[57] ABSTRACT

A locking device for use with trailer hitches having sliding-sleeve type latch mechanisms disposed at the forward end of the trailer tongue member, the locking device comprising slot means provided on the trailer tongue member adjacent to the rear edge of the sliding-sleeve when the said sliding-sleeve is in its forward latched position, a stop plate is engagable with the rear edge of the sliding-sleeve thereby preventing retraction of the said sliding-sleeve, and removable retainer means provided on the stop plate to prevent removal of the said stop plate from the said slot means.

2 Claims, 3 Drawing Figures

PATENTED JUN 28 1974    3,820,823

LOCKING DEVICE FOR TRAILER HITCHES

BACKGROUND OF THE INVENTION

1. Field of the Invention

This invention relates to locking devices for trailer hitches and more particularly, but not by way of limitation, to a locking device for use with trailer hitches having sliding-sleeve type mechanisms whereby provisions are made for removably installing a stop plate adjacent to the rear edge of the sliding-sleeve when the said sleeve is in its forward latched position, and even more particularly but not by way of limitation to a locking device for trailer hitches having a lever operated sliding-sleeve mechanism whereby the stop plate means is removably secured between the rear edge of the sleeve member and the lever actuator therefor which prevents pivoting of the lever operator for retraction of the sleeve member to unlatch the trailer hitch.

2. Description of the Prior Art

In the use of trailer hitches pulled by vehicles, there is the constant danger of the trailer hitch becoming unlatched from the vehicle thereby creating extreme hazards. There is also always the constant threat of the trailer being unhooked from the towing vehicle and stolen. There is also the threat of the trailer being stolen when it is not in use by simply being connected to a suitable trailer hitch on the theif's vehicle and towed away from its parked position.

Presently available locking devices for trailer hitches are of a wide variety but usually employ complicated devices for either closing the ball shaped opening of the trailer hitch member or for precluding the raising of the front wheel element when the hitch is to be locked against unwarranted use. For the most part, presently available locking devices include devices which engage the opening female portion of the hitch member and many require the use of a key type lock inserted within the ball shaped opening.

However, these type of locking devices for trailer hitches have certain disadvantages in that complicated devices are generally expensive and require a considerable amount of time to put into effect. Seldom does one find a locking device which will not only prevent the trailer hitch from becoming disconnected while being towed but also prevent unwarranted and unauthorized use of the vehicle when it is stowed or parked. Most quick release type trailer hitch mechanisms are adequate to keep the trailer hitched to the ball mechanism so long as it does not become inadvertently unlatched. However, the presently available locking devices require modification of the existing latch mechanism which serves to weaken the said latch mechanism and thereby create a secondary safety problem.

SUMMARY OF THE INVENTION

The present invention contemplates a novel locking device for use with trailer hitches having sliding-sleeve type latch mechanisms which provides a removable stop plate which may be inserted in the slot provided in the trailer tongue member adjacent to the rear edge of the sliding-sleeve in order to prevent the retraction of the said sleeve member. When using the present invention with a trailer hitch having a lever operated sliding-sleeve member, the stop plate may be inserted between the lever operator and the sleeve member without requiring any modification of the trailer hitch mechanism, the trailer tongue or the trailer itself. This stop plate is configured so that one end thereof may be insertable between the sleeve and the lever operator and an ordinary padlock placed in the aperture therein to prevent the unauthorized removal of the said stop plate.

This locking device takes only a minimal amount of time to install and serves not only to prevent the trailer hitch from inadvertently becoming unhooked while being towed, but can also prevent the trailer from being connected to an unauthorized towing vehicle while the trailer is not in use. By using a high strength stainless steel material for constructing the stop plate and by using a high quality stainless steel padlock presently available on the market it would be extremely difficult if not impossible to use ordinary cutting torch methods to remove the locking device without also destroying the trailer hitch which would in turn make it very difficult for the thief to tow the trailer away. This novel trailer hitch locking device is simple and efficient in operation and economical and durable in construction.

DESCRIPTION OF THE DRAWINGS

Other and further advantageous features of the present invention will hereinafter more fully appear in connection with a detailed description of the drawings in which.

DETAILED DESCRIPTION OF THE INVENTION

Figure 1:
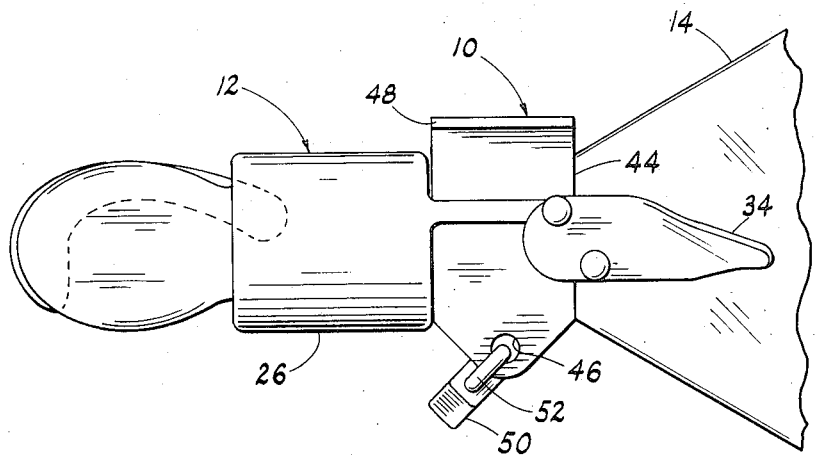
FIG. 1 is a plan view of a trailer hitch with a locking device embodying the present invention in place thereon.

Referring to the drawings in detail, reference character 10 generally indicates a locking device for use with a sliding-sleeve type trailer hitch generally indicated by reference character 12. The trailer hitch 12 is secured to the forward end of a trailer tongue member 14. The trailer hitch 12 generally comprises an elongated cylindrical rod 16 which is rigidly secured at one end thereof to the forward end of the tongue member 14. A ball socket member 18 is rigidly secured to the forward end of the rod 16 by welding or the like, or may be made an integral part thereof. The ball socket member 18 is provided with a substantially hemispherical ball shaped recess 20 in the bottom thereof for a purpose that will be hereinafter set forth. A substantially L-shaped hook latch member 22 is pivotally secured to the rod 16 adjacent to the socket member 18 by means of a vertically disposed pin 24. One side and the front of the socket member 18 is provided with an L-shaped slot 25 which is configured to receive the L-shaped latch member 22 therein for a purpose that will be hereinafter set forth. A substantially cylindrical sleeve member 26 is reciprocally disposed on the rod 16 so that when the said sleeve member 26 is in its forward most position the L-shaped latch member 22 is forced into the slot 25 of the socket member 18 and held in place within the slot 25. When the sleeve member 26 is retracted toward the rear portion of the rod 16, the L-shaped latch member 22 may be pivoted out of the slot 25 and away from the socket member 18.

The upper portion of the sleeve member 26 is provided with a rearwardly extending operator or push rod 28 secured thereto or made as an integral part thereof. An elongated lever operator arm 30 is pivotally secured to the trailer tongue member 14 by means of a vertically disposed pin member 32. One end of the operator lever 30 is pivotally secured to the rear end of the push rod 28 so that when the operator lever 30 is pivoted about the vertical pin 32, the push rod 28 is moved substantially longitudinal thereby causing longitudinal movement of the sleeve member 26 along the rod 16. The opposite end of the operator lever 30 is provided with a handle member 34 for ease of reciprocation of the sleeve member 26.

In actual practice the pivot pin 32 for the operator lever 30 is disposed adjacent to one side of the operator 30 while the push rod attach pivot pin 29 is located adjacent to the end of the operator lever 30 and offset therefrom toward the opposite side of the said lever arm 30. By employing somewhat loose tolerances between the sleeve member 26 and the rod 16, substantially longitudinal reciprocating motion may be applied to the sleeve member 26 along the rod 16.

Figure 2:
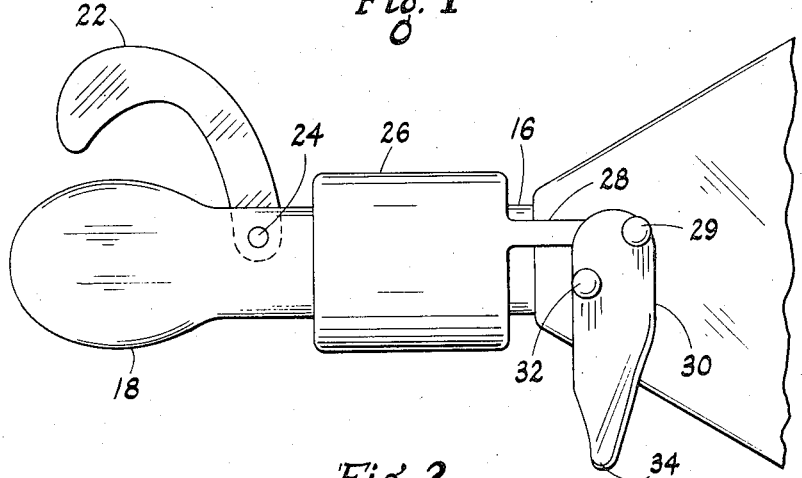
FIG. 2 is a plan view of the trailer hitch mechanism of FIG. 1 with the locking device removed and the trailer hitch latching mechanism in a retracted position.

Referring to FIG. 1, when the operator lever 30 is in a longitudinal position with respect to the trailer tongue 14, the sleeve member 26 is forced to its forward most position thereby closing the latch member 22 and locking it in place within the slot 25. When the operator lever 30 is rotated in a clockwise direction to a traverse position as shown in FIG. 2 the sleeve member 26 is reciprocated rearwardly thereby allowing the release of the latch member 22 so that it may be pivoted out of the slot 25 and away from the socket member 18.

Figure 3:
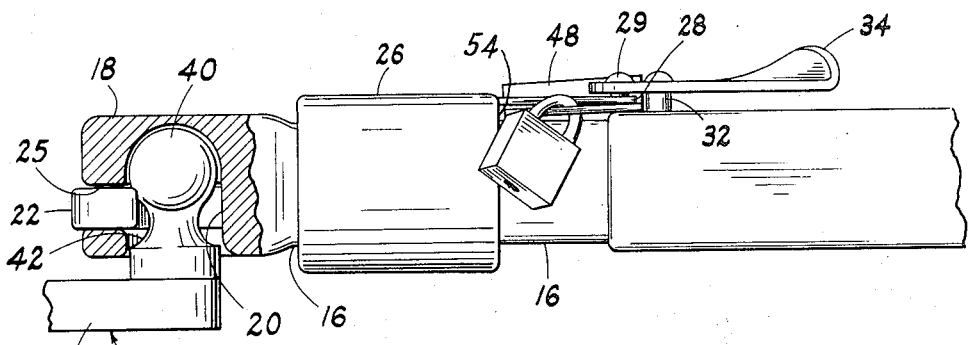
FIG. 3 is a profile view of the trailer hitch of FIG. 1 with the attached locking device in place and connected to a vehicle tow hitch.

Referring now to FIG. 3, the typical ball type vehicle tow hitch generally indicated by reference character 36 consists of a rearwardly extending tow hitch frame member 38, which is rigidly secured to the frame of the towing vehicle (not shown), having an upwardly extending ball member 40 secured to the rear end of the said frame member 38. The ball member 40 is provided with an annular recess portion or neck portion 42 adjacent to the frame member 38.

When connecting the trailer hitch 12 to the tow hitch 36 the socket member 18 is placed over the ball member 40 and pushed downwardly thereon so that the ball member 40 is received in the ball shaped recess 20 with the sleeve member 26 being fully retracted and the L-shaped latch member 22 pivoted away from the socket member 18. After the ball member 40 is seated within the recess 20 of the socket member 18, the L-shaped latch member 22 may be pivoted into the slot 25 of the socket member 18 so that the inner edge of the latch member 22 is disposed within the recess 42 of the ball member 40 which will prevent removal of the said ball member 40 from the socket member 18. The lever operator 30 may then be rotated in a counterclockwise direction thereby pushing the sleeve member 26 to its forward most position on the rod 16 which is beyond the pivot pin 24 of the latch member 22 thereby locking the said latch member 22 into position within the slot 25 of the socket member 18.

The locking device 10 comprises an elongated substantially rectangular stop plate 44 having one end thereof tapered inwardly toward the center. The tapered end portion of the stop plate 44 is provided with a centrally disposed bore 46 therethrough and the opposite end of the stop plate 44 is provided with a traversely disposed flange member 48 for a purpose that will be hereinafter set forth. An ordinary key operated padlock 50 having a shackle member 52 is provided for use with the locking device 10 in a manner that will be hereinafter set forth.

It is readily apparent from the foregoing that when the trailer (not shown) is not in use, the trailer hitch 12 may be operated to a latched position as shown in FIG. 1 and the stop plate 44 of the locking device 10 inserted in a slot 54 created between the back surface or edge of the sleeve member 26 and the vertically disposed pivot pin 32 of the operator lever 30 and vertically between the push rod 28 of the sleeve member 26 and the upper surface of the tongue member 14 and associated forwardly extending rod member 16. It is noted that when the stop plate 44 is in the position as hereinbefore described and as shown in FIGS. 1 and 3, operation of the operator lever 30 is prohibited thereby locking the sleeve member 26 in its forward most latched position. The flange member 48 will prevent removal of the stop plate 44 in one direction. This will prohibit the trailer hitch 12 from being connected to a towing vehicle for unauthorized use or theft. The padlock 50 may then be connected to the stop plate 44 by passing the shackle 52 through the bore 46 which will prevent removal of the stop plate from the slot 54. It is also noted that the slot 54 may be provided in the tongue member 14 or the rod 16 if a lever operator is not available.

Likewise, when the trailer hitch 12 is connected to a towing vehicle and is latched into position as shown in FIG. 3, the locking device 10 may be installed as hereinbefore described in order to prevent the removal of the hitch 12 from the vehicle tow hitch 36 either inadvertently during travel or by attempted theft or unauthorized use thereof.

It is noted that the components of the locking device 10 comprising the stop plate 44, the flange 48 and the padlock 50 should be constructed of a heavy duty, high strength stainless steel material to prevent removal thereof by a cutting torch or other metal cutting apparatus.

From the foregoing, it will be apparent that the present invention provides a locking device for use with trailer hitches particularly designed and constructed for providing added safety in the towing of trailers and the like and for preventing theft of trailers while they are attached to towing vehicles or when the trailer is parked and not in use.

Whereas the present invention has been described in particular relation to the drawings attached hereto, it should be understood that other and further modifications, apart from those shown or suggested herein, may be made within the spirit and scope of this invention.

What is claimed is:

1. A locking device in combination with a trailer hitch and a trailer tongue member, said trailer hitch having a lever operated sliding sleeve latch mechanism disposed at the forward end of said trailer tongue member, said sliding sleeve latch mechanism including a cylindrical rod rigidly secured at one end to the forward end of said tongue member and carrying a socket at the forward end thereof, a sliding sleeve slidably disposed on said elongated cylindrical rod, an operator rod connected to the sleeve member and extending rearwardly therefrom in spaced parallel relation with said elongated cylindrical rod, a pin member mounted adjacent the forward end of said tongue member, a lever pivotally mounted on said pin member, the rear end of said operator rod being pivotally connected to said lever, said locking device comprising slot means provided on said trailer tongue member adjacent to the rear edge of said sliding sleeve when said sliding sleeve is in its forward latched position, said slot means constituting the space defined by the rear edge of said sliding sleeve, the lower surface of said operator rod, the upper surface of said cylindrical rod and the forward portion of said pin member, a stop plate constructed of high strength stainless steel and having one end thereof removably inserted through said slot means so that said stop plate is engageable with the rear edge of the sliding sleeve and the forward portion of said pin member thereby preventing retraction of said sliding sleeve, and removable retainer means provided on said stop plate to prevent removal of said stop plate from said slot means.

2. A locking device as set forth in claim 1 wherein the removable retainer means comprises a bore provided in one end of said stop plate and a commercially available stainless steel padlock having a shackle which is connectable through the bore in said stop plate.

* * * * *